US011476944B1

(12) United States Patent
Lin et al.

(10) Patent No.: US 11,476,944 B1
(45) Date of Patent: Oct. 18, 2022

(54) MULTI-CHANNEL TRANSMITTER

(71) Applicant: National Tsing Hua University, Hsinchu (TW)

(72) Inventors: Fan-Yi Lin, Hsinchu (TW); Chia-Chi Liu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 17/372,590

(22) Filed: Jul. 12, 2021

(51) Int. Cl.
*H04B 10/516* (2013.01)

(52) U.S. Cl.
CPC .................................. *H04B 10/516* (2013.01)

(58) Field of Classification Search
CPC .... H04B 10/25; H04B 10/291; H04B 10/504; H04B 10/516
See application file for complete search history.

(56) References Cited

U.S. PATENT DOCUMENTS

| 8,977,121 | B2* | 3/2015 | Djordjevic | H04B 10/25 398/43 |
|---|---|---|---|---|
| 9,413,372 | B1* | 8/2016 | Valley | G01R 23/17 |
| 11,153,009 | B1* | 10/2021 | Parker | H04B 10/07957 |
| 11,153,670 | B1* | 10/2021 | Winzer | H04Q 11/0067 |
| 2019/0020438 | A1* | 1/2019 | Kang | H04B 10/506 |

FOREIGN PATENT DOCUMENTS

| CN | 105005052 A | 10/2015 |
|---|---|---|
| CN | 110098555 A | 8/2019 |
| CN | 110600973 A | 12/2019 |

OTHER PUBLICATIONS

Taiwanese Search Report for Taiwanese Application No. 110125456, dated Jan. 12, 2022, with an English translation.

* cited by examiner

*Primary Examiner* — Dzung D Tran
(74) *Attorney, Agent, or Firm* — Birch, Stewart, Kolasch & Birch, LLP (57) ABSTRACT

A multi-channel transmitter includes a light source, a pulse generator and a mode splitter. The light source generates a continuous source light wave with multiple modes that are different from each other in terms of wavelength and waveform. The pulse generator generates, based on the continuous source light wave, an intermediate light pulse with multiple modes that are different from each other in terms of wavelength and waveform. The mode splitter has a plurality of output terminals, and generates, based on the intermediate light pulse and respectively at the output terminals thereof, a plurality of output light pulses that respectively correspond to the modes of the intermediate light pulse.

12 Claims, 10 Drawing Sheets

MULTI-CHANNEL TRANSMITTER

FIELD

The disclosure relates to multiple-input and multiple-output (MIMO) techniques, and more particularly to a multi-channel transmitter.

BACKGROUND

A LiDAR system is a system that measures a distance therefrom to a target by illuminating the target with laser light and measuring time of flight the laser light takes to return to the LiDAR system. The time of flight is obtained by computing cross-correlation of a returned signal (i.e., the laser light received by the LiDAR system) and a reference signal (i.e., the laser light transmitted by the LiDAR system).

Figure 1:
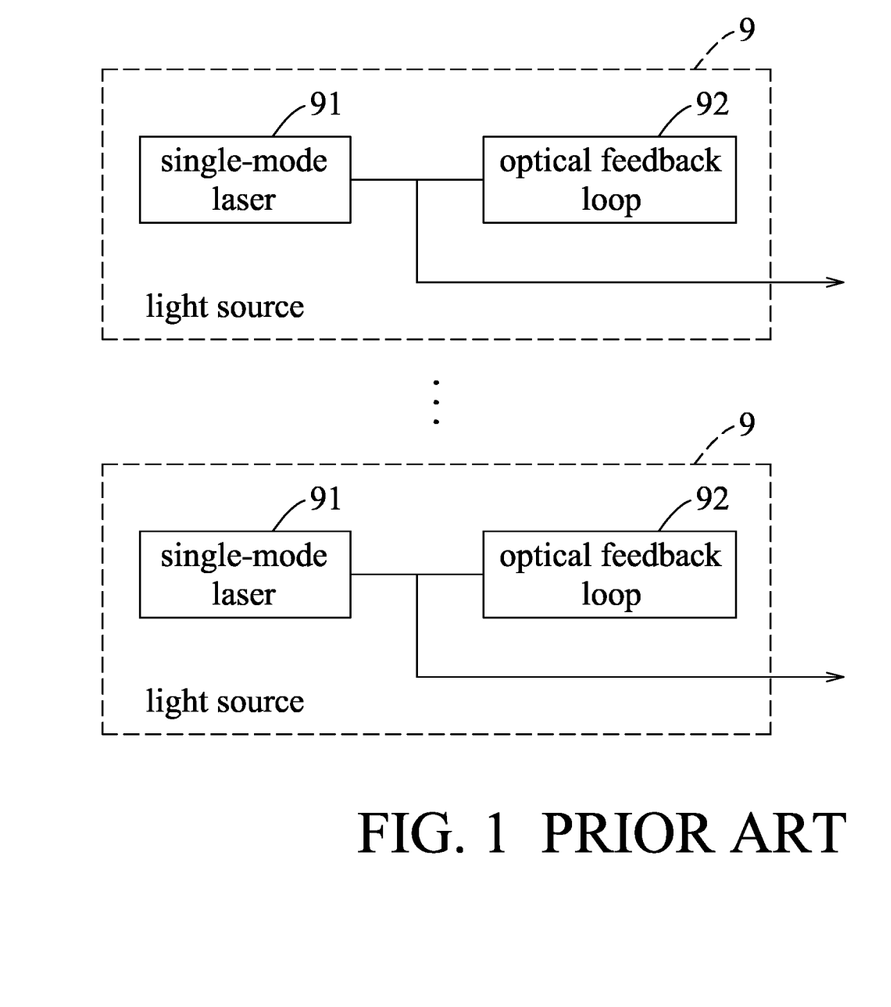
FIG. 1 is a block diagram illustrating a conventional multi-channel transmitter to be used in a multiple-input and multiple-output (MIMO) LiDAR system.

Referring to FIG. 1, a conventional multi-channel transmitter that is to be used in a multiple-input and multiple-output (MIMO) LiDAR system includes a plurality of light sources 9. Each of the light sources 9 is a single-mode chaotic light source, and includes a single-mode laser 91 and an optical feedback loop 92. The single-mode laser 91 generates a continuous light wave having a single mode. The optical feedback loop 92 is coupled to the single-mode laser 91 to receive a portion of the continuous light wave, and reflects the portion of the continuous light wave back to the single-mode laser 91, so as to disturb the light field in the single-mode laser 91 to make the continuous light wave chaotic. The remaining portion of the continuous light wave serves as an output of the conventional multi-channel transmitter.

Each of the light sources 9 has its own chaotic characteristics, so similarity of any two of the outputs of the conventional multi-channel transmitter is low, causing the MIMO LiDAR system to have excellent anti-jamming, anti-interference and anti-ambiguity capabilities in ranging.

However, the conventional multi-channel transmitter is bulky and costly, which is adverse to miniaturization and cost reduction of the MIMO LiDAR system. In addition, the conventional multi-channel transmitter would cause the MIMO LiDAR system to have a relatively poor detection probability, a relatively poor detection precision and a relatively long computing time.

SUMMARY

Therefore, an object of the disclosure is to provide a multi-channel transmitter that can alleviate at least one of the drawbacks of the prior art.

According to the disclosure, the multi-channel transmitter includes a light source, a pulse generator and a mode splitter. The light source generates a continuous source light wave that has multiple modes. The modes of the continuous source light wave are different from each other in terms of wavelength and waveform. The pulse generator is coupled to the light source to receive the continuous source light wave, and generates, based on the continuous source light wave, an intermediate light pulse that has multiple modes. The modes of the intermediate light pulse are different from each other in terms of wavelength and waveform. The mode splitter has an input terminal that is coupled to the pulse generator to receive the intermediate light pulse, and a plurality of output terminals. The mode splitter generates, based on the intermediate light pulse, a plurality of output light pulses respectively at the output terminals thereof. The output light pulses respectively correspond to the modes of the intermediate light pulse.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
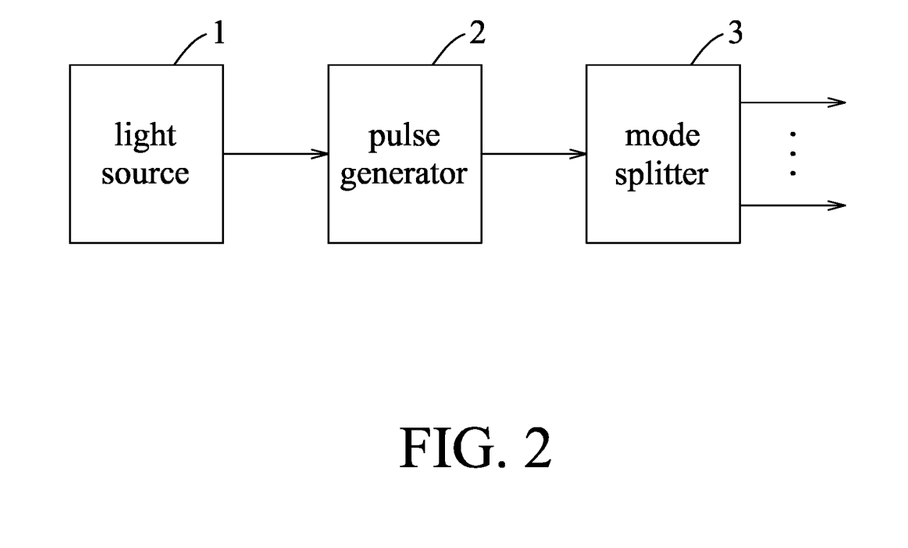
FIG. 2 is a block diagram illustrating a first embodiment of a multi-channel transmitter according to the disclosure to be used in a MIMO LiDAR system.

Referring to FIG. 2, a first embodiment of a multi-channel transmitter according to the disclosure is to be used in a multiple-input and multiple-output (MIMO) LiDAR system, and includes a light source 1, a pulse generator 2 and a mode splitter 3. The light source 1 generates a continuous source light wave that has multiple modes. The modes of the continuous source light wave are different from each other in terms of wavelength and waveform. The pulse generator 2 is coupled to the light source 1 to receive the continuous source light wave, and generates, based on the continuous source light wave, an intermediate light pulse that has multiple modes. The modes of the intermediate light pulse are different from each other in terms of wavelength and waveform. The mode splitter 3 has an input terminal that is coupled to the pulse generator 2 to receive the intermediate light pulse, and a plurality of output terminals. Based on the intermediate light pulse, the mode splitter 3 generates a plurality of output light pulses respectively at the output terminals thereof, where the output light pulses respectively correspond to the modes of the intermediate light pulse.

Figure 3:
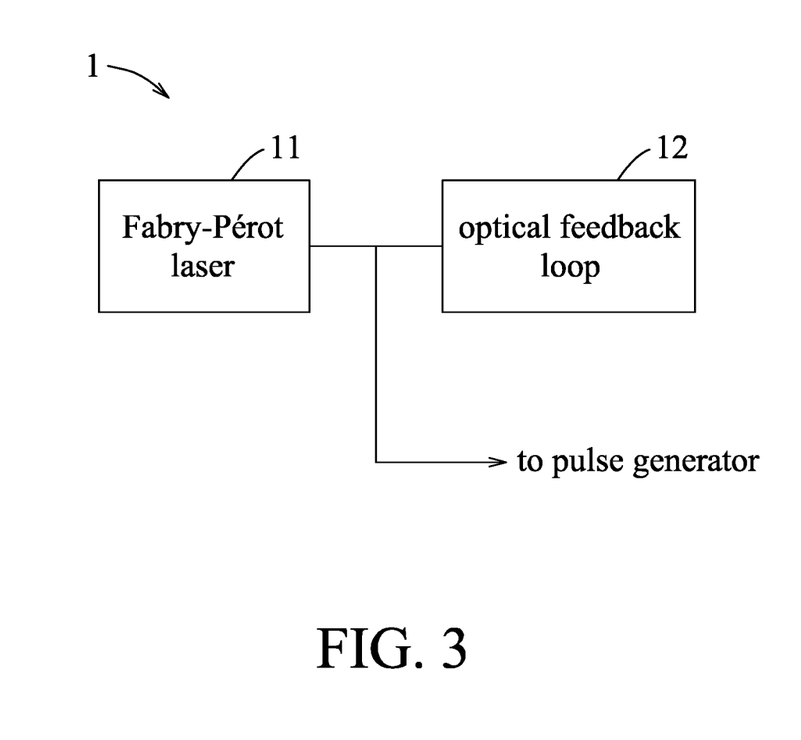
FIG. 3 is a block diagram illustrating an implementation of a light source of the first embodiment.

In this embodiment, the light source 1 is a multi-mode chaotic light source, and may use at least one of optical feedback, optical injection or optoelectronic feedback for chaos generation. FIG. 3 illustrates an implementation of the light source 1. In the implementation as shown in FIG. 3, the light source 1 includes a Fabry-Perot laser 11 and an optical feedback loop 12. The Fabry-Perot laser 11 is a multi-mode laser. The optical feedback loop 12 may be a fiber type loop, a free space loop or a planar waveguide loop.

In this embodiment, the pulse generator 2 may be configured to at least modulate a continuous input light wave, which originates from the continuous source light wave, to generate a source light pulse, from which the intermediate light pulse originates. Optionally, the pulse generator 2 may be configured to further amplify an input light pulse that originates from the source light pulse to generate the intermediate light pulse. Alternatively, the pulse generator 2 may be configured to at least amplify the continuous input light wave in a predetermined time period to generate the intermediate light pulse.

Figure 4:
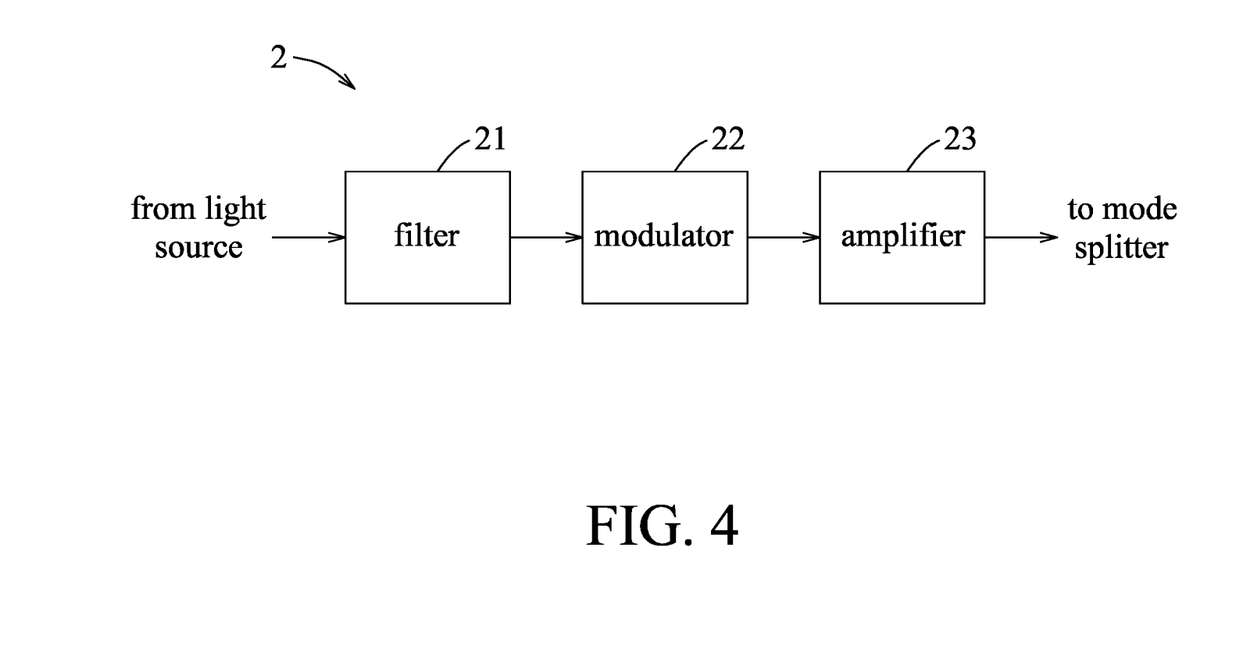
FIG. 4 is a block diagram illustrating a first implementation of a pulse generator of the first embodiment.
Figure 5:
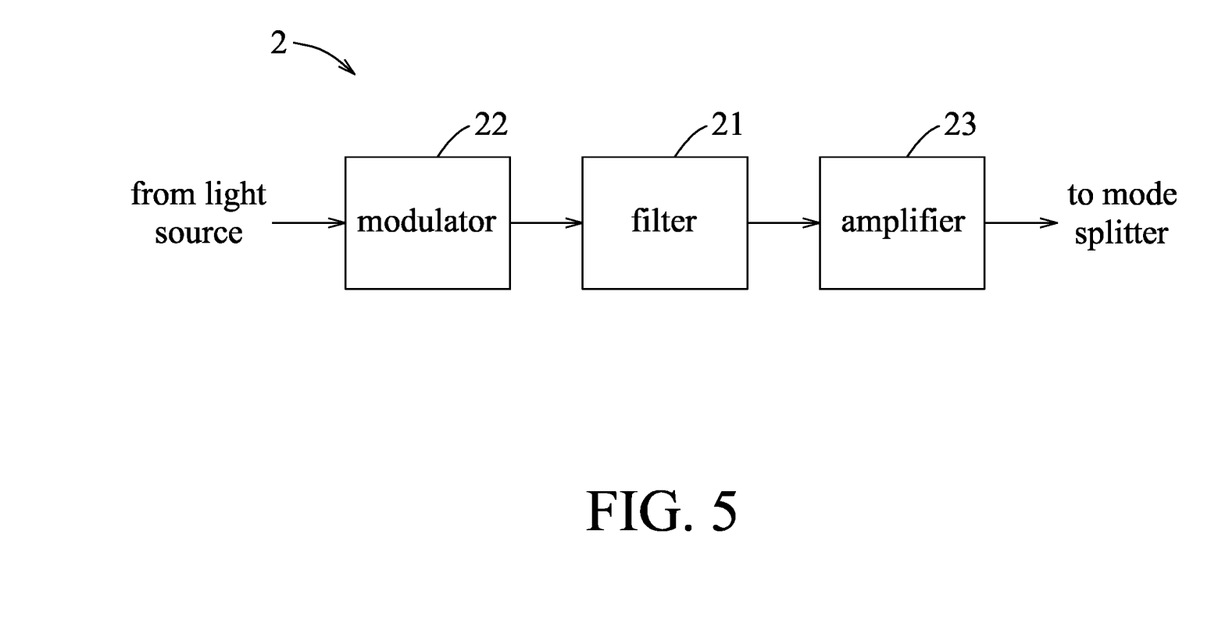
FIG. 5 is a block diagram illustrating a second implementation of the pulse generator.
Figure 6:
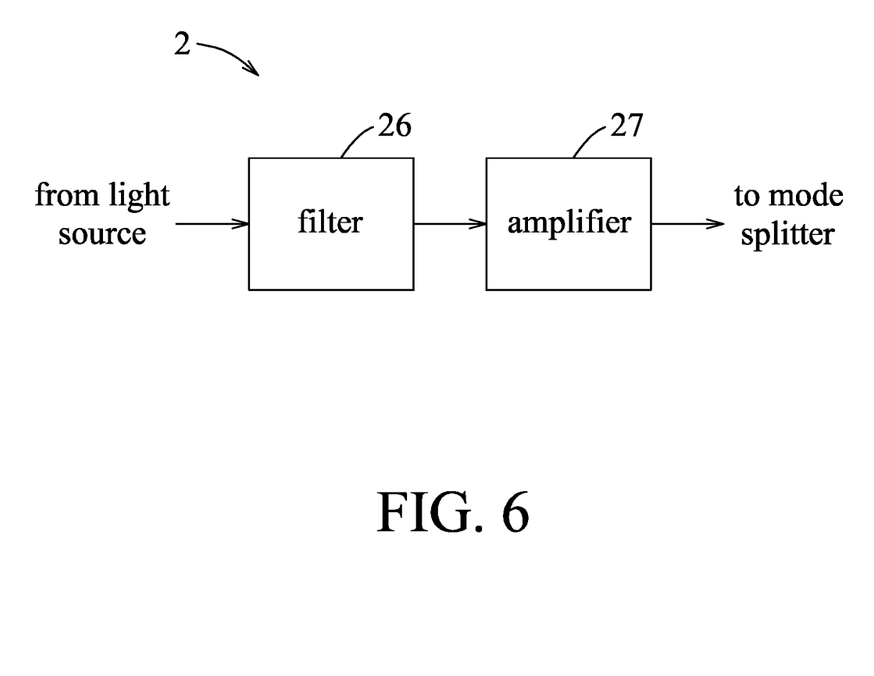
FIG. 6 is a block diagram illustrating a third implementation of the pulse generator.

FIGS. 4 to 6 respectively illustrate first to third implementations of the pulse generator 2 that are suitable under a circumstance where a total number of the modes of the intermediate light pulse is smaller than a total number of the modes of the continuous source light wave.

In the first implementation as shown in FIG. 4, the pulse generator 2 includes a filter 21, a modulator 22 and an amplifier 23. The filter 21 is coupled to the light source 1 (see FIG. 2) to receive the continuous source light wave. The filter 21 filters the continuous source light wave to remove at least one of the modes of the continuous source light wave, so as to generate the continuous input light wave. The filter 21 may be a bandpass filter, or may be implemented using fiber Bragg gratings (FBGs). The modulator 22 is coupled to the filter 21 to receive the continuous input light wave, and modulates the continuous input light wave to generate the source light pulse. The modulator 22 may be an electro-optic modulator (EOM) that modulates the continuous input light wave based on an electric field, or may be an acousto-optic modulator (AOM) that modulates the continuous input light wave based on an acoustic wave. The amplifier 23 is coupled to the modulator 22 to receive the source light pulse to serve as the input light pulse, and is further coupled to the input terminal of the mode splitter 3 (see FIG. 2). The amplifier 23 amplifies the input light pulse to generate the intermediate light pulse for receipt by the input terminal of the mode splitter 3 (see FIG. 2).

The second implementation as shown in FIG. 5 is similar to the first implementation as shown in FIG. 4, but differs from the first implementation in that: (a) the modulator 22 is coupled to the light source 1 (see FIG. 2) to receive the continuous source light wave to serve as the continuous input light wave; (b) the filter 21 is coupled to the modulator 22 to receive the source light pulse, and filters the source light pulse to remove at least one mode of the source light pulse so as to generate the input light pulse; and (c) the amplifier 23 is coupled to the filter 21 to receive the input light pulse.

In the third implementation as shown in FIG. 6, the pulse generator 2 includes a filter 26 and an amplifier 27. The filter 26 is coupled to the light source 1 (see FIG. 2) to receive the continuous source light wave. The filter 26 filters the continuous source light wave to remove at least one of the modes of the continuous source light wave, so as to generate the continuous input light wave. The filter 26 may be a bandpass filter, or may be implemented using FBGs. The amplifier 27 is coupled to the filter 26 to receive the continuous input light wave, is further coupled to the input terminal of the mode splitter 3 (see FIG. 2), and is operable in an enabled mode and a disabled mode. The amplifier 27 is controlled to operate in the enabled mode within the predetermined time period and to operate in the disabled mode outside the predetermined time period, so that it amplifies the continuous input light wave in the predetermined time period to generate the intermediate light pulse for receipt by the input terminal of the mode splitter 3 (see FIG. 2). The amplifier 27 may be a semiconductor optical amplifier (SOA).

It should be noted that, under a circumstance where the total number of the modes of the intermediate light pulse is equal to the total number of the modes of the continuous source light wave, the filters 21 of the first and second implementations as shown in FIGS. 4 and 5 and the filter 26 of the third implementation as shown in FIG. 6 can be omitted.

In this embodiment, the output light pulses may be concurrent or staggered in time. The mode splitter 3 is configured to at least split the modes of the intermediate light pulse apart, so as to generate a plurality of split light pulses, from which the output light pulses respectively originate.

Figure 7:
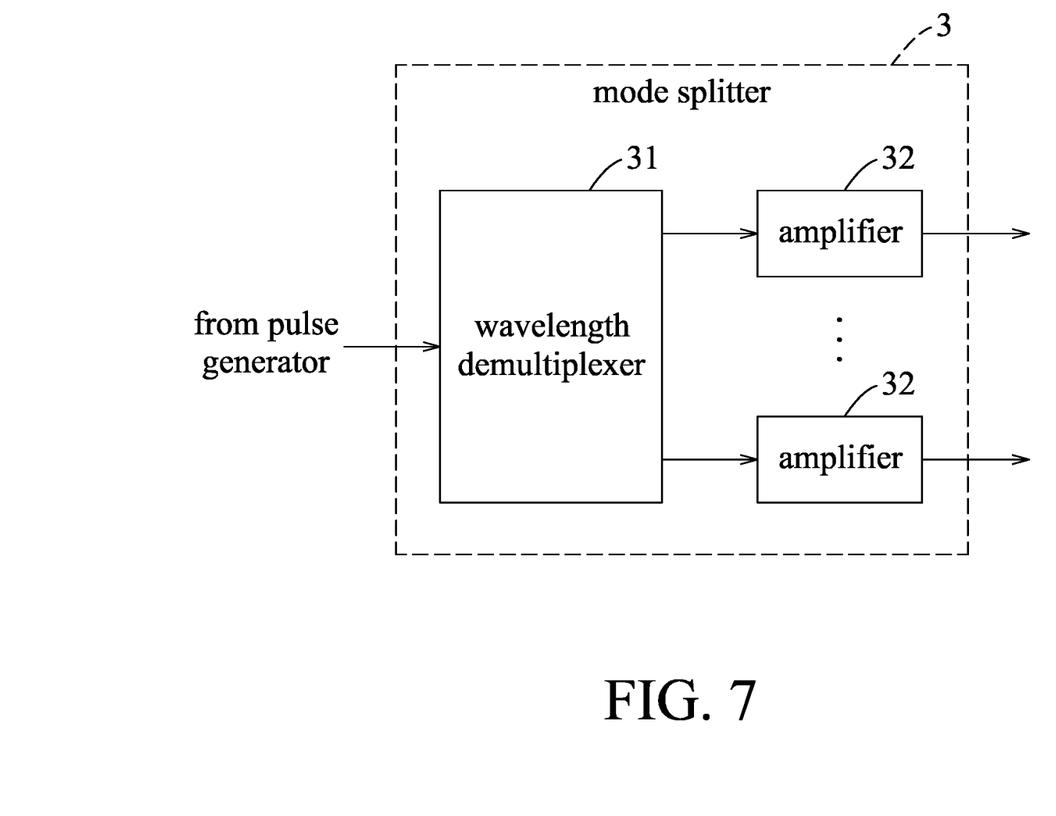
FIG. 7 is a block diagram illustrating a first implementation of a mode splitter of the first embodiment.

FIG. 7 illustrates a first implementation of the mode splitter 3, the output light pulses generated by which are concurrent. In the first implementation as shown in FIG. 7, the mode splitter 3 includes a wavelength demultiplexer 31 and a plurality of amplifiers 32. The wavelength demultiplexer 31 has an input terminal that is coupled to the input terminal of the mode splitter 3 to receive the intermediate light pulse, and a plurality of output terminals. The wavelength demultiplexer 31 splits the modes of the intermediate light pulse apart to generate the split light pulses respectively at the output terminals thereof. The wavelength demultiplexer 31 may be implemented using FBGs. The amplifiers 32 are respectively coupled to the output terminals of the wavelength demultiplexer 31 to respectively receive the split light pulses, and are further respectively coupled to the output terminals of the mode splitter 3. Each of the amplifiers 32 amplifies the respective one of the split light pulses to generate a respective one of the output light pulses at the respective one of the output terminals of the mode splitter 3. Each of the amplifiers 32 may be an erbium-doped fiber amplifier (EDFA).

Figure 8:
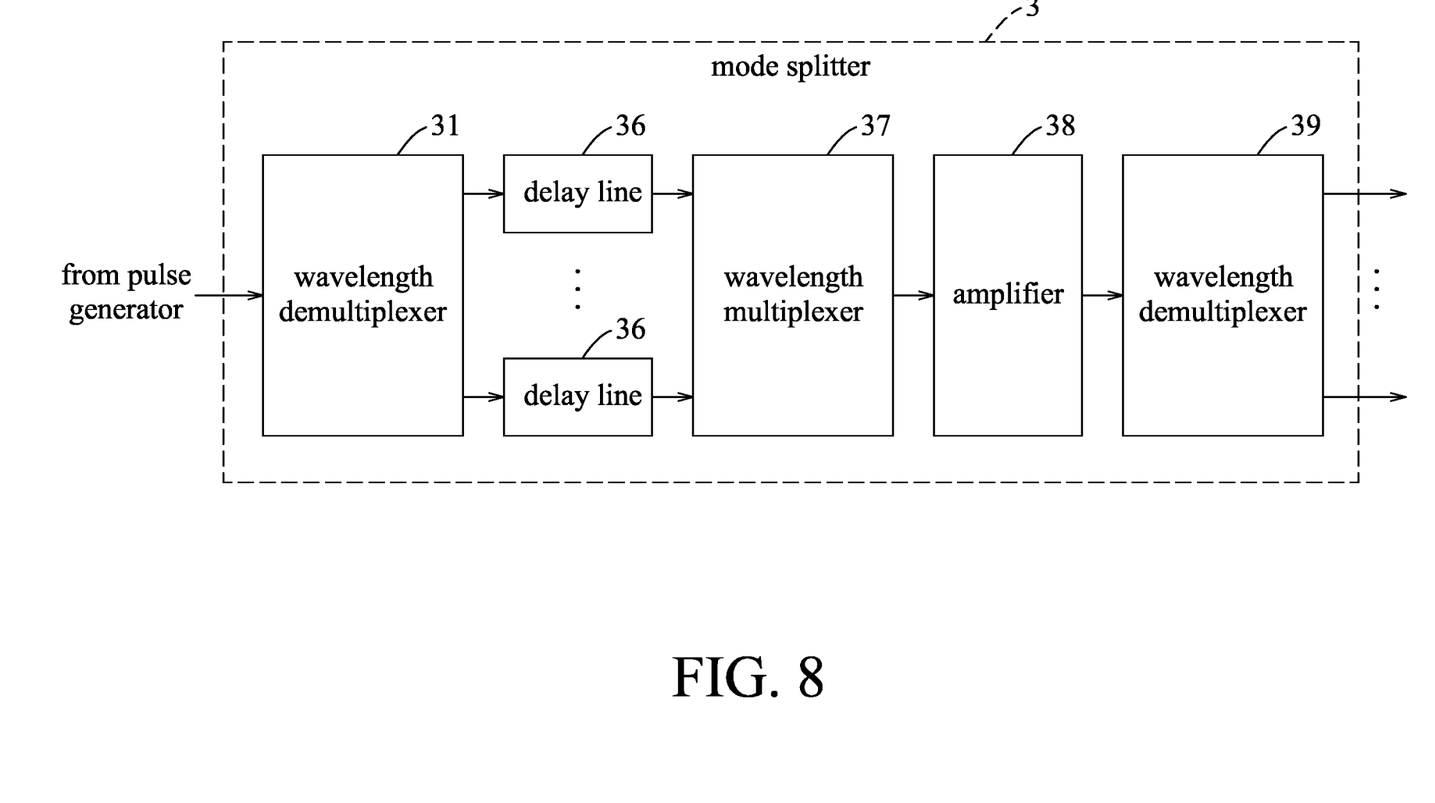
FIG. 8 is a block diagram illustrating a second implementation of the mode splitter.

FIG. 8 illustrates a second implementation of the mode splitter 3, the output light pulses generated by which are staggered in time. In the second implementation as shown in FIG. 8, the mode splitter 3 includes a wavelength demultiplexer 31 identical to that of FIG. 7, a plurality of delay lines 36, a wavelength multiplexer 37, an amplifier 38 and another wavelength demultiplexer 39. The delay lines 36 are respectively coupled to the output terminals of the wavelength demultiplexer 31 to respectively receive the split light pulses, and respectively delay the split light pulses by different delay times to respectively generate a plurality of delayed light pulses that are staggered in time. The wavelength multiplexer 37 has a plurality of input terminals that are respectively coupled to the delay lines 36 to respectively receive the delayed light pulses, and an output terminal. The wavelength multiplexer 37 joins the delayed light pulses together to generate a joined light signal at the output terminal thereof. The amplifier 38 is coupled to the output terminal of the wavelength multiplexer 37 to receive the joined light signal, and amplifies the joined light signal to generate an amplified light signal. The amplifier 38 may be an EDFA. The wavelength demultiplexer 39 has an input terminal that is coupled to the amplifier 38 to receive the amplified light signal, and a plurality of output terminals that are respectively coupled to the output terminals of the mode splitter 3. The wavelength demultiplexer 39 splits apart the delayed light pulses contained in the joined light signal to generate the output light pulses respectively at the output terminals thereof. The wavelength multiplexer 37 and the wavelength demultiplexer 39 may be implemented using FBGs.

In view of the above, the multi-channel transmitter of this embodiment has the following advantages.

1. By virtue of the light source 1 generating the continuous source light wave that has multiple modes, the multi-channel transmitter can be compact and cheap, which is beneficial to miniaturization and cost reduction of the MIMO LiDAR system.

2. By virtue of the pulse generator 2 generating, based on the continuous source light wave, the intermediate light pulse that has multiple modes, the multi-channel transmitter can have a relatively large signal-to-noise ratio (SNR) since it can have a relatively high peak output power even if its power budget is limited. Therefore, the MIMO LiDAR system can have a relatively good detection probability and a relatively good detection precision. In addition, computing time of the MIMO LiDAR system can be reduced by decreasing a width of the intermediate light pulse.

Figure 9:
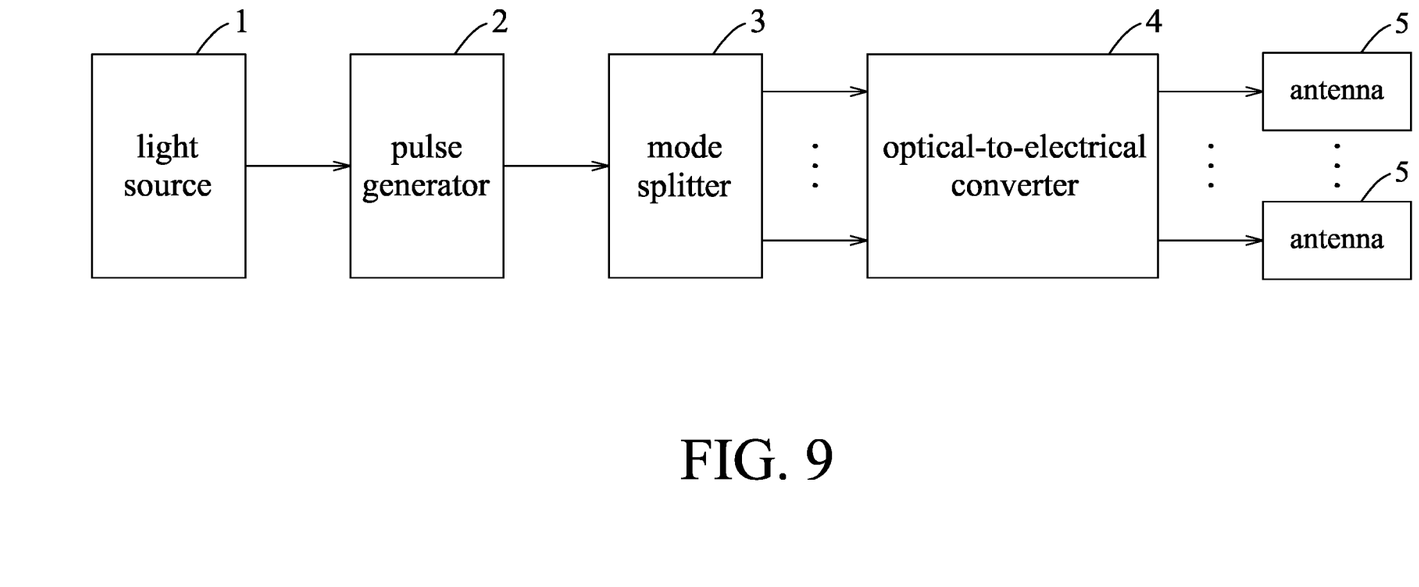
FIG. 9 is a block diagram illustrating a second embodiment of the multi-channel transmitter according to the disclosure to be used in a MIMO radar system.

Referring to FIG. 9, a second embodiment of the multi-channel transmitter according to the disclosure is to be used in a MIMO radar system, is similar to the first embodiment, but differs from the first embodiment in that the multi-channel transmitter of the second embodiment further includes an optical-to-electrical converter 4 and a plurality of antennas 5.

In the second embodiment, the optical-to-electrical converter 4 is coupled to the output terminals of the mode splitter 3 to receive the output light pulses, and converts the output light pulses respectively into a plurality of output electrical pulses. The antennas 5 are coupled to the optical-to-electrical converter 4 to respectively receive the output electrical pulses, and respectively radiate the output electrical pulses.

Figure 10:
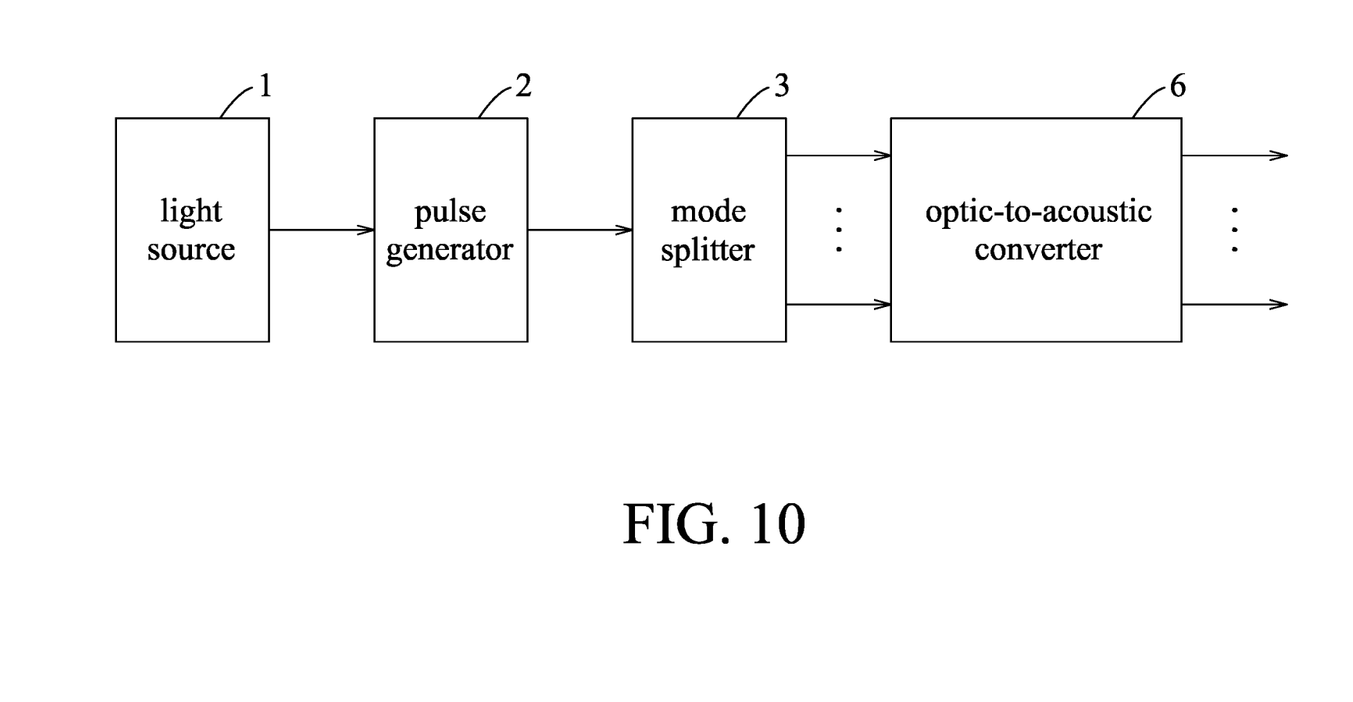
FIG. 10 is a block diagram illustrating a third embodiment of the multi-channel transmitter according to the disclosure to be used in a MIMO sonar system.

Referring to FIG. 10, a third embodiment of the multi-channel transmitter according to the disclosure is to be used in a MIMO sonar system, is similar to the first embodiment, but differs from the first embodiment in that the multi-channel transmitter of the third embodiment further includes an optic-to-acoustic converter 6.

In the third embodiment, the optic-to-acoustic converter 6 is coupled to the output terminals of the mode splitter 3 to receive the output light pulses, and converts the output light pulses respectively into a plurality of output acoustic pulses.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. A multi-channel transmitter comprising:
a light source generating a continuous source light wave that has multiple modes, the modes of the continuous source light wave being different from each other in terms of wavelength and waveform;
a pulse generator coupled to said light source to receive the continuous source light wave, and generating, based on the continuous source light wave, an intermediate light pulse that has multiple modes, the modes of the intermediate light pulse being different from each other in terms of wavelength and waveform; and
a mode splitter having an input terminal that is coupled to said pulse generator to receive the intermediate light pulse, and a plurality of output terminals,
wherein based on the intermediate light pulse, said mode splitter generates a plurality of output light pulses respectively at said output terminals thereof, the output light pulses respectively corresponding to the modes of the intermediate light pulse;
wherein said pulse generator includes
a modulator to receive a continuous input light wave, which originates from the continuous source light wave, and modulating the continuous input light wave to generate a source light pulse, from which the intermediate light pulse originates,
an amplifier coupled to said input terminal of said mode splitter, to receive an input light pulse that originates from the source light pulse, and amplifying the input light pulse to generate the intermediate light pulse for receipt by said input terminal of said mode splitter, and
a filter coupled to said light source to receive the continuous source light wave, and further coupled to said modulator, said filter filtering the continuous source light wave to remove at least one of the modes of the continuous source light wave, so as to generate the continuous input light wave for receipt by said modulator.

2. The multi-channel transmitter of claim 1, wherein said light source is a multi-mode chaotic light source.

3. The multi-channel transmitter of claim 1, wherein said modulator is an electro-optic modulator.

4. The multi-channel transmitter of claim 1, wherein said modulator is an acousto-optic modulator.

5. The multi-channel transmitter of claim 1, wherein said mode splitter includes:
a first wavelength demultiplexer having an input terminal that is coupled to said input terminal of said mode splitter to receive the intermediate light pulse, and a plurality of output terminals, said first wavelength demultiplexer splitting the modes of the intermediate light pulse apart to generate, respectively at said output terminals thereof, a plurality of split light pulses, from which the output light pulses respectively originate.

6. The multi-channel transmitter of claim 5, wherein said mode splitter further includes:
a plurality of amplifiers respectively coupled to said output terminals of said first wavelength demultiplexer to respectively receive the split light pulses, and further respectively coupled to said output terminals of said mode splitter, each of said amplifiers amplifying the respective one of the split light pulses to generate a respective one of the output light pulses at the respective one of said output terminals of said mode splitter.

7. The multi-channel transmitter of claim 5, wherein said mode splitter further includes:
a plurality of delay lines respectively coupled to said output terminals of said first wavelength demultiplexer to respectively receive the split light pulses, and respectively delay the split light pulses by different delay times to respectively generate a plurality of delayed light pulses;
a wavelength multiplexer having a plurality of input terminals that are respectively coupled to said delay lines to respectively receive the delayed light pulses, and an output terminal, said wavelength multiplexer joining the delayed light pulses together to generate a joined light signal at said output terminal thereof;
an amplifier coupled to said output terminal of said wavelength multiplexer to receive the joined light signal, and amplifying the joined light signal to generate an amplified light signal; and
a second wavelength demultiplexer having an input terminal that is coupled to said amplifier to receive the amplified light signal, and a plurality of output terminals that are respectively coupled to said output terminals of said mode splitter, said second wavelength demultiplexer splitting apart the delayed light pulses contained in the joined light signal to generate the output light pulses respectively at said output terminals thereof.

8. The multi-channel transmitter of claim 1, further comprising:
an optical-to-electrical converter coupled to said output terminals of said mode splitter to receive the output light pulses, and converting the output light pulses respectively into a plurality of output electrical pulses; and
a plurality of antennas coupled to said optical-to-electrical converter to respectively receive the output electrical pulses, and respectively radiating the output electrical pulses.

9. The multi-channel transmitter of claim 1, further comprising:
an optic-to-acoustic converter coupled to said output terminals of said mode splitter to receive the output light pulses, and converting the output light pulses respectively into a plurality of output acoustic pulses.

10. A multi-channel transmitter comprising:
a light source generating a continuous source light wave that has multiple modes, the modes of the continuous source light wave being different from each other in terms of wavelength and waveform;
a pulse generator coupled to said light source to receive the continuous source light wave, and generating, based on the continuous source light wave, an intermediate light pulse that has multiple modes, the modes of the intermediate light pulse being different from each other in terms of wavelength and waveform; and
a mode splitter having an input terminal that is coupled to said pulse generator to receive the intermediate light pulse, and a plurality of output terminals,
wherein based on the intermediate light pulse, said mode splitter generates a plurality of output light pulses respectively at said output terminals thereof, the output light pulses respectively corresponding to the modes of the intermediate light pulse;
wherein said pulse generator includes
a modulator to receive a continuous input light wave, which originates from the continuous source light wave, and modulating the continuous input light wave to generate a source light pulse, from which the intermediate light pulse originates,
an amplifier coupled to said input terminal of said mode splitter, to receive an input light pulse that originates from the source light pulse, and amplifying the input light pulse to generate the intermediate light pulse for receipt by said input terminal of said mode splitter, and
a filter coupled to said modulator to receive the source light pulse, and further coupled to said amplifier, said filter filtering the source light pulse to remove at least one mode of the source light pulse, so as to generate the input light pulse for receipt by said amplifier.

11. A multi-channel transmitter comprising:
a light source generating a continuous source light wave that has multiple modes, the modes of the continuous source light wave being different from each other in terms of wavelength and waveform;
a pulse generator coupled to said light source to receive the continuous source light wave, and generating, based on the continuous source light wave, an intermediate light pulse that has multiple modes, the modes of the intermediate light pulse being different from each other in terms of wavelength and waveform; and
a mode splitter having an input terminal that is coupled to said pulse generator to receive the intermediate light pulse, and a plurality of output terminals,
wherein based on the intermediate light pulse, said mode splitter generates a plurality of output light pulses respectively at said output terminals thereof, the output light pulses respectively corresponding to the modes of the intermediate light pulse;
wherein said pulse generator includes
an amplifier coupled to said input terminal of said mode splitter, to receive a continuous input light wave that originates from the continuous source light wave, and amplifying the continuous input light wave in a predetermined time period to generate the intermediate light pulse for receipt by said input terminal of said mode splitter, and
a filter coupled to said light source to receive the continuous source light wave, and further coupled to said amplifier, said filter filtering the continuous source light wave to remove at least one of the modes of the continuous source light wave, so as to generate the continuous input light wave for receipt by said amplifier.

12. A multi-channel transmitter comprising:
a light source generating a continuous source light wave that has multiple modes, the modes of the continuous source light wave being different from each other in terms of wavelength and waveform;
a pulse generator coupled to said light source to receive the continuous source light wave, and generating, based on the continuous source light wave, an intermediate light pulse that has multiple modes, the modes of the intermediate light pulse being different from each other in terms of wavelength and waveform; and
a mode splitter having an input terminal that is coupled to said pulse generator to receive the intermediate light pulse, and a plurality of output terminals, wherein based on the intermediate light pulse, said mode splitter generates a plurality of output light pulses respectively at said output terminals thereof, the output light pulses respectively corresponding to the modes of the intermediate light pulse;

wherein said mode splitter includes
- a first wavelength demultiplexer having an input terminal that is coupled to said input terminal of said mode splitter to receive the intermediate light pulse, and a plurality of output terminals, said first wavelength demultiplexer splitting the modes of the intermediate light pulse apart to generate, respectively at said output terminals thereof, a plurality of split light pulses, from which the output light pulses respectively originate,
- a plurality of delay lines respectively coupled to said output terminals of said first wavelength demultiplexer to respectively receive the split light pulses, and respectively delay the split light pulses by different delay times to respectively generate a plurality of delayed light pulses,
- a wavelength multiplexer having a plurality of input terminals that are respectively coupled to said delay lines to respectively receive the delayed light pulses, and an output terminal, said wavelength multiplexer joining the delayed light pulses together to generate a joined light signal at said output terminal thereof,
- an amplifier coupled to said output terminal of said wavelength multiplexer to receive the joined light signal, and amplifying the joined light signal to generate an amplified light signal, and
- a second wavelength demultiplexer having an input terminal that is coupled to said amplifier to receive the amplified light signal, and a plurality of output terminals that are respectively coupled to said output terminals of said mode splitter, said second wavelength demultiplexer splitting apart the delayed light pulses contained in the joined light signal to generate the output light pulses respectively at said output terminals thereof.

\* \* \* \* \*